June 9, 1964 R. L. ATKINSON 3,136,140
MACHINERY GUARDS
Original Filed April 28, 1961 2 Sheets-Sheet 1
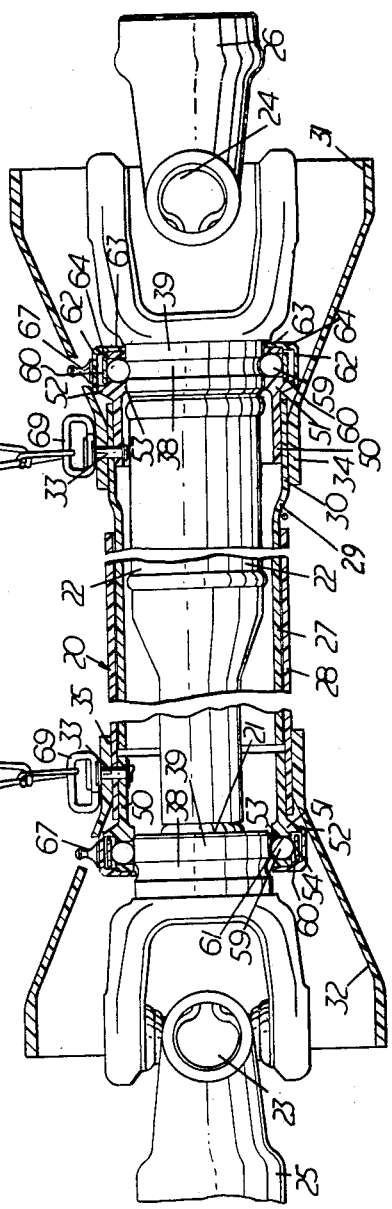
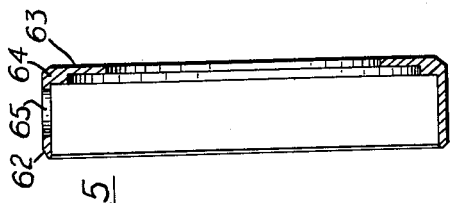
Inventor
Richard Leslie Atkinson
By E. M. Squire
Attorney

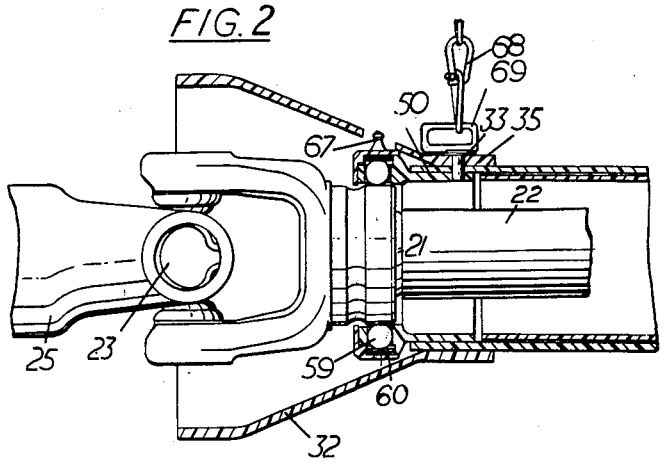
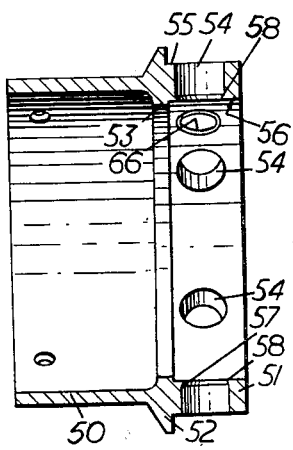
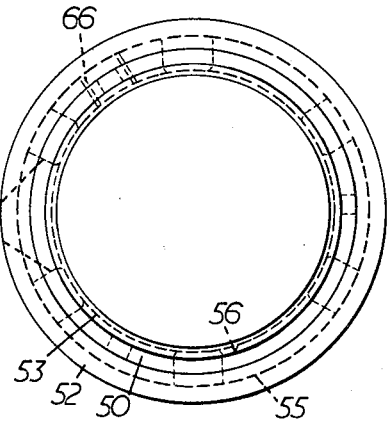

United States Patent Office 3,136,140
Patented June 9, 1964

3,136,140
MACHINERY GUARDS
Richard Leslie Atkinson, Bolton-by-Bowland, near Clitheroe, England, assignor to Atkinson's of Clitheroe Limited, Clitheroe, England, a British company
Original application Apr. 28, 1961, Ser. No. 106,397, now Patent No. 3,091,101, dated May 28, 1963. Divided and this application Dec. 13, 1962, Ser. No. 244,431
Claims priority, application Great Britain Aug. 20, 1960
7 Claims. (Cl. 64—4)

This invention relates to machinery guards, and more particularly to safety guards of the kind comprising a tubular sheath adapted floatingly to encompass and be supported by a rotatable shaft. The invention relates also to bearings adapted to be mounted internally of such guards to enable the guards to float when in position about shafts adapted to rotate when the machinery is in operation.

The application is a division of my copending application Serial No. 106,397 filed April 28, 1961, now Patent No. 3,091,101.

A particular application of safety guards of the kind aforesaid is their use with shaft couplings of the kind comprising a telescopic shaft provided at each of its ends with a universal joint from which extend stub shafts for connection to driving and driven machinery, respectively.

Such telescopic shafts, as now being supplied to industry, generally have an annular groove machined in the yoke boss to that side of each universal joint remote from the stub shaft, these annular grooves being intended to provide races for balls of the bearings enabling safety guards to float on the shafts when mounted in encompassing relationship therewith.

An object of the present invention is to provide safety guards of the kind aforesaid adapted for use with shaft couplings of the kind aforesaid having an annular groove machined in the yoke boss to that side of each universal joint remote from the stub shaft, said guards being efficient, readily fitted on and removed from the shaft couplings, and less costly than safety guards of the kind aforesaid heretofore available.

The present invention is the combination of an extensible shaft comprising telescopically-associated shaft parts, the respective shaft parts having annular grooves providing inner bearing races, telescopically-related guard sheaths surrounding said shaft parts and extending across the respective bearing races, a ring about each said bearing race, said ring having therein at spaced intervals circumferentially-spaced holes on radial axes and reducing in cross-sectional area at their inner ends, seatings at said inner ends, rolling members located in said holes and bearing on said seatings, said rolling members having a diameter normal to the rolling axis greater than the depth of said holes, said rolling members making rolling contact with said respective bearing race, an annular resilient clip encompassing said ring and bridging over said holes externally, means attaching said ring to the respective sheath to that side of said ring in the direction telescoping said sheaths, the respective resilient clip being adapted to be overcome by radial outward movement of the respective rolling members on application of a sharp axial pull on the respective sheath in the direction telescoping said sheaths thereby to unseat said respective rolling members from the respective bearing race and permit withdrawal along the respective shaft part of said respective sheath together with said respective ring, rolling members, and resilient clip, thus to expose said respective bearing race.

The present invention is also an annular anti-friction bearing device enabling mounting of a guard sheath in concentric encircling relationship to a shaft which has therein an annular groove which is part-circular in section and opens radially outwardly from said shaft, said bearing device comprising a ring having therein a plurality of cylindrical holes on radial axes, said holes being equally spaced apart circumferentially of said ring, annular shoulders projecting inwardly from the hole-defining surrounds at the inner ends of said holes, balls located in said holes, said balls being of greater diameter than the minimum diameter defined by said shoulders and of greater diameter than the depth of said holes, an annular resilient clip encompassing said ring and pressing said balls radially inwards to an extent limited by said shoulders, said balls when so pressed inwardly being adapted to make rolling contact with said annular groove, said clip being adapted to be expanded circumferentially to enable said balls to move radially outwards in said holes and define a minimum diameter exceeding the maximum groove diameter, and a collar integral with said ring and adapted to be secured internally to said sheath.

An embodiment of the invention will now be described, by way of example, with reference to the accompanying drawings, in which:

FIG. 1 is a longitudinal section of a machinery guard in accordance with the invention mounted about a telescopic shaft provided at each of its ends with a universal joint from which extend stub shafts for connection to driving and driven machinery, respectively;

FIG. 2 is a view corresponding to the left-hand end of FIG. 1, but showing the annular anti-friction bearing means expanded circumferentially, prior to push fitting same into position in the annular groove in the shaft;

FIG. 3 is an axial section illustrating the annular anti-friction bearing means of the machinery guards, the ball bearings being omitted;

FIG. 4 is a front elevation of the annular bearing means; and

FIGS. 5 and 6 are, respectively, an axial section and a front elevation of a cover cap for the bearing means of the machinery guard.

Referring now to the drawings, throughout which the same parts all denoted by like reference numerals, a machinery guard 20, which is intended for use with a shaft coupling comprising a telescopic shaft 21, 22 provided at each of its ends with a universal joint 23, 24, respectively, from which extend stub shafts 25, 26, respectively, for connection one to driving machinery and the other to driven machinery, comprises two telescopically-engaging tubular sheaths 27, 28 of which the inner one 27 is a sliding fit within the other 28 and is locally offset outwardly near its outer end at 29 to provide an end portion 30 of substantially the same diameter as the outer sheath 28, the annular shoulder 29 thus formed at the offset defining the extent to which the inner sheath 27 can telescope within the outer sheath 28. The sheaths 27 and 28 are preferably of rigid polyvinyl chloride, but may be of, say, polythene or other suitable synthetic resin, or other suitable material resistant to deterioration on exposure in the open air.

Frusto-conoidal end portions 31, 32, respectively, are secured to the outer end of the sheaths 27, 28, by means of rivets 33. Manifestly the end portions could be otherwise secured to the outer ends of the sheaths, but riveting is a convenient method as will hereinafter appear. Three circumferentially spaced rivets 33 suffice for securing each end portion to each sheath, but any convenient number could be used, consistent with adequate strength in the joint. As can be seen from FIGS. 1 and 2, the end portions have at their ends of minimum diameter, integral sleeves 34, 35, respectively, which fit snugly about the ends of the sheaths 27, 28 and through which they are secured to the latter by the rivets 33. The end portions 31, 32, like the sheaths 27, 28, are of material resistant to deterioration on exposure out of doors, such as polythene, for example, and may be rigid, semi-rigid or substantially flexible.

There is mounted internally at the end of each sheath 27 and 28 and secured thereto by the rivets 33 securing the end portion 31 or 32 thereon, a collar 50 which is a snug fit within the sheath 27 or 28 and which is integral with a ring 51 substantially thicker than the collar. The ring 41 at its end adjacent the collar has an annular ridge 52 on its outer surface 55 and a further and shallower annular ridge 53 on its inner surface 56. Several, for example six as shown, equispaced holes 54 are drilled from the outer surface 55 of the ring, centrally of the width of the ring to the inner surface 56 of the ring, the axes of the holes 54 being radial of the ring. These holes are cylindrical throughout most of their length, there being a frusto-conoidal section 57 adjacent the inner surface of the ring and tapering in the direction of the ring axis, which results in a collar 58 of substantially triangular cross-section. Steel balls 59 placed in these holes 54 co-operate with the annular groove 38 machined in the yoke boss 39. The collar 58 retains the balls in position from the inner surface of the ring, and on the outside of the ring the balls are held in position by a spring clip 60 which is of width to bridge over and cover the holes externally. The annular ridge 53 on the inner surface 56 of the ring 51 co-operates with the surface 61 of the yoke boss 39 to prevent dust and water from reaching the steel balls 59. A dustproof and waterproof cover cap 62 is fitted over the annular ridge 52 on the outer surface 55 of the ring 51 from the side of the ring remote from said ridge 52, the cap 62 having a vertical flange 63 with an internal shoulder 64 enabling same to be snap fitted on to the ring from the side of the ring remote from the ridge 52. The inner edge 64 of the flange co-operates with the surface 61 of the yoke boss 39 to prevent dust and water from reaching the steel balls 59, and both the cap 62 and spring clip 60 provide protection to the balls from the outside. A grease nipple 67 penetrates in an axial direction the cover cap 62, through a hole 65 in the cap, and the spring clip 60, through a hole (not shown) in the clip, and co-operates with a tapped hole 66 in the ring 51, the tapped hole 66 being equidistant between two of the holes 54 which hold the steel balls 59. This grease nipple allows lubrication of the steel balls 59 and the annular groove 38 machined in the yoke boss 39.

When fitting the machinery guard just described about a telescopic shaft, the shapt parts 21, 22 are disconnected, as are also the tubular sheaths 27, 28. A thin film of light grease is smeared in the annular bearing groove 38 of each shaft part 21 and 22. The part 21 of the shaft is fitted into the tubular sheath 28 and the part 22 of the shaft is fitted into the tubular sheath 27. When this operation is carried out, each shaft part is pushed, with its end which mates with the other shaft part leading, into the end piece 31 or 32 and along the sheath. The bearing ring 51 rides along the annular surface of the shaft part, the spring clip 60 expands circumferentially and enables the balls to move radially outwards when the bearing is being pushed over the yoke boss and any other obstacle in the way during fitment of the sheath on the shaft. When the bearing reaches its allotted position on the yoke boss, the balls are seated in the groove by the resilient compression of the spring clip 60.

Correct fitting is checked by rotating the shaft part within the tubular sheath. Any necessary length adjustment of the tubular sheaths is then effected by cutting off any excessive length, it being proper that the ends of the shaft parts should project slightly from the ends of the tubular sheaths. The shaft parts 21 and 22 are then re-connected and the sheath 27 telescoped into the sheath 28 at the same time. The telescopic shaft with the guard 20 fitted therearound can now be fitted between a tractor power-take-off and an implement to be driven therefrom.

When the telescopic shaft with the guard 20 is so fitted, and the machinery is driven, the guard 20 will usually rotate with the shaft but will stop rotating and float on the shaft in the event that any pressure is applied thereto, for example by someone laying a hand on the guard.

When fitting the telescopic shaft to the tractor power-take-off and implement mechanism, these operations are faciliated by pulling the related tubular sheath free from the yoke boss, a sharp pull being sufficient, and withdrawing the sheath along the shaft to expose the end of the shaft. The universal joints can be readily exposed for lubrication purposes by the same procedure when the shaft is coupled up. The annular bearing groove could be lubricated at the same time.

Thus the machinery guard can be fitted on and removed from the telescopic guard very easily and without the need of tools, save possibly for a sharp knife or hacksaw in the course of initial fitment. The bearings are sealed against ingress of dirt and water. The guard as described will usually rotate with the telescopic shaft, unless touched, but where it is desired that the guard should be non-rotating at all times, chains 68 can be fitted as shown in FIG. 5 by means of securing clips 69 and the rivets 33. The chains 68 have anchor clips 70 at their other ends whereby they can be clipped, on the one hand to a relatively stationary part of the tractor, and on the other hand to a relatively stationary part of the implement.

I claim:

1. The combination of an extensible shaft comprising telescopically-associated shaft parts, the respective shaft parts having annular grooves providing inner bearing races, telescopically-related guard sheaths surrounding said shaft parts and extending across the respective bearing races, a ring about each said bearing race, said ring having therein at spaced intervals circumferentially-spaced holes on radial axes and reducing in cross-sectional area at their inner ends, seatings at said inner ends, rolling members located in said holes and bearing on said seatings, said rolling members having a diameter normal to the rolling axis greater than the depth of said holes, said rolling members making rolling contact with said respective bearing race, an annular resilient clip encompassing said ring and bridging over said holes externally, means attaching said ring to the respective sheath to that side of said ring in the direction telescoping said sheaths, the respective resilient clip being adapted to be overcome by radial outward movement of the respective rolling members on application of a sharp axial pull on the respective sheath in the direction telescoping said sheaths thereby to unseat said respective rolling members from the respective bearing race and permit withdrawal along the respective shaft part of said respective sheath together with said respective ring, rolling members, and resilient clip, thus to expose said respective bearing race.

2. The combination set forth in claim 1 wherein said attaching means comprises a collar integral with said ring, said collar fitting snugly within said respective sheath, and means securing said collar internally to said sheath.

3. The combination set forth in claim 2 including an internal circumferential ridge on said ring, an external circumferential ridge on said ring, said ridges being at the collar-adjacent end of said ring, said internal ridge slidingly fitting about the respective shaft part and spacing said ring from said respective shaft part, an annular cap circumferentially overlying said ring and having a collar-adjacent edge and a collar-remote edge, an inwardly-directed circumferential flange at said collar-remote edge of said cap and slidingly fitting about said respective shaft part, and said collar-adjacent edge of said cap seating on said external ridge.

4. The combination set forth in claim 3, in which said ring, said clip, and said cap have each a hole, said holes being radially-aligned, said ring hole being tapped, a grease-nipple extending into said holes and having a threaded end engaging said tapped hole in said ring, and said respective sheath having a hole radially aligned with the aforesaid holes and providing external access to said grease nipple.

5. A power shaft assembly comprising first and second telescopically-interconnected shafts respectively having first and second means concentrically thereon and affording first and second annular grooves opening radially outwardly and axially spaced apart; first and second telescopically related tubular sheaths concentrically encircling said shafts, first and second rings having therein circumferentially-spaced cylindrical holes on radial axes, said holes terminating at their inner ends in frusto-conoidal sections tapering in the direction of the ring axis and reducing the cross-section of said holes, the surrounds of said holes thereby forming shoulders at said inner ends of said holes, balls located in said holes, said balls having a diameter greater than the depth of said holes and greater also than the inner diameter of said shoulders, said balls making rolling contact with said first and second annular grooves, first and second annular resilient clips encompassing respectively said first and second rings and resiliently pushing said balls radially inwards, said clips being adapted to yield to an extent sufficient to enable said balls to be wholly extracted from said first and second annular grooves, first and second collars integral with said first and second rings respectively, said first and second collars fitting snugly within said first and second sheaths respectively, said collars being located of the respective sheaths relative to said rings, means attaching each said collar to its respective sheath, the constructions being such that a sharp pull on either of said sheaths in the direction telescoping said sheaths wholly extracts the respective balls from the respective groove and enables said either of said sheaths with the attached said collar, ring, balls and clip to be drawn along the respective shaft to expose the respective annular groove.

6. An annular anti-friction bearing device enabling mounting of a guard sheath in concentric encircling relationship to a shaft which has therein an annular groove which is part-circular in section and opens radially outwardly from said shaft, said bearing device comprising a ring having therein a plurality of cylindrical holes on radial axes, said holes being equally spaced apart circumferentially of said ring, annular shoulders projecting inwardly from the hole-defining surrounds at the inner ends of said holes, balls located in said holes, said balls being of greater diameter than the minimum diameter defined by said shoulders and of greater diameter than the depth of said holes, an annular resilient clip encompassing said ring and pressing said balls radially inwards to an extent limited by said shoulders, said balls when so pressed inwardly being adapted to make rolling contact with said annular groove, said clip being adapted to be expanded circumferentially to enable said balls to move radially outwards in said holes and define a minimum diameter exceeding the maximum groove diameter, and a collar integral with said ring and adapted to be secured internally to said sheath.

7. For use with a shaft having annular groove opening radially outwardly therefrom, a tubular sheath adapted to encompass said shaft, a ring having therein circumferentially-spaced cylindrical holes on radial axes, inturned annular shoulders at the inner ends of said holes, balls located in said holes, said balls having a diameter greater than the depth of said holes and greater also than the minimum diameter defined by said shoulders, said balls being adapted to seat in said groove, an annular resilient clip encompassing said groove and pushing said balls radially inwardly, said clip being yieldable to an extent permitting radial outward movement of said balls beyond the diameter of said shaft adjacent said groove, a collar integral with said ring and fitting snugly within said sheath, and means securing said collar internally to said sheath.

References Cited in the file of this patent

UNITED STATES PATENTS

| | | |
|---|---|---|
| 2,665,958 | Waldherr | Jan. 12, 1954 |
| 2,919,562 | Weasler | Jan. 5, 1960 |